United States Patent [19]
Bush

[11] 3,951,670
[45] Apr. 20, 1976

[54] CRISTOBALITE SUPPRESSION IN HIGH-SILICA $Li_2O$-$Al_2O$-$SiO_2$ DEVITRIFIED GLASS FRITS

[75] Inventor: Edward A. Bush, Painted Post, N.Y.

[73] Assignee: Corning Glass Works, Corning, N.Y.

[22] Filed: Feb. 10, 1975

[21] Appl. No.: 548,548

[52] U.S. Cl............ 106/39.7; 106/39.8; 106/53; 106/54; 106/52; 65/33
[51] Int. Cl.² ............ C03C 3/22; C03C 3/04
[58] Field of Search............ 106/39.7; 65/33

[56] References Cited
UNITED STATES PATENTS

| | | | |
|---|---|---|---|
| 2,998,675 | 9/1961 | Olcott | 106/53 |
| 3,006,775 | 10/1961 | Chen | 106/39.7 |
| 3,084,053 | 4/1963 | Arlett et al. | 106/39.7 |
| 3,112,184 | 11/1963 | Hollenbach | 106/39.7 |
| 3,157,522 | 11/1964 | Stookey | 106/39.7 |
| 3,251,403 | 5/1966 | Smith | 106/39.7 |
| 3,279,931 | 10/1966 | Olcott | 106/39.7 |
| 3,600,204 | 8/1971 | Beall et al. | 106/39.7 |
| 3,839,001 | 10/1974 | Adams et al. | 106/39.7 |

*Primary Examiner*—Winston A. Douglas
*Assistant Examiner*—Mark Bell
*Attorney, Agent, or Firm*—Barry S. Bissell; Richard N. Wardell; Clarence R. Patty, Jr.

[57] ABSTRACT

Suppression of a high expansion cristobalite phase during sintering of high silica glass frits crystallizing in situ to predominantly a low-expansion β-spodumene solid solution phase is accomplished by either melting a suppressant compound with the glass batch or adding the suppressant to the glass frit prior to sintering, the cristobalite suppressant being selected from the oxides of the alkali metals, the alkaline earth metals, yttrium, lanthanum, titanium, niobium, tantalum, boron, zinc, lead and antimony. The oxides with divalent and tetravalent cations are selected in quantities of up to about 0.02 moles of suppressant per 100 grams of glass and the other suppressants are selected in quantities up to about 0.01 moles per 100 grams of glass.

5 Claims, 2 Drawing Figures

CRISTOBALITE SUPPRESSION IN HIGH-SILICA $LI_2O$-$AL_2O_3$-$SIO_2$ DEVITRIFIED GLASS FRITS

BACKGROUND OF THE INVENTION

U.S. Pat. No. 3,600,204 discloses a field of $Li_2O$-$Al_2O_3$-$SiO_2$ glass frits that were developed for shaping and firing into crystalline ceramic (or glass-ceramic) articles having very low average thermal expansions by virtue of the beta-spodumene solid solution crystals therein and having excellent dimensional stability for long periods of time at temperatures up to 900°C. One such frit has been particularly and advantageously employed in the manufacture of the several parts of composite regenerative heat exchanger bodies as described in U.S. Pat. Nos. 3,112,184 and 3,251,403.

U.S. Pat. No. 3,839,001 discloses an improvement in processing the glass frits yielding the above beta-spodumene glass-ceramics wherein a small quantity of a particulate crystalline seeding material is added to the frit prior to shaping and results in sintered bodies with more uniform thermal expansion hysteresis than the bodies without the seeding material additive. Both the base compositions and the improvement compositions are useful over the compositional range (expressed by weight as oxides) of 3.5–7.5% $Li_2O$, 15–30% $Al_2O_3$ and 65–80% $SiO_2$ with the mole ratio of $Al_2O_3$:$Li_2O$ being between about 1.0–1.5. One of the seeding materials (although not the preferred material) is titania. Other seeding materials are beta-spodumene, beta-spodumene solid solution, alpha-spodumene, petalite, zirconia, zircon, silicon, and mixtures thereof.

Regenerators made using compositions in the ranges specified above have generally been suitable. However, although the expansions have been low, it would be desirable if the expansion over a normal operating temperature range of a gas turbine engine, i.e., about 25°–800°C., be substantially zero. Work toward such a goal taught that the silica level must be raised to the upper levels in the range stated to produce zero expansion bodies up to 800°C., but that at the higher silica levels (greater than 74% silica) crystallization of cristobalite became a problem, the cristobalite causing higher and more variable expansions in the crystallized bodies. And although the cristobalite could be avoided by firing to higher temperatures, these higher temperatures approach the melting point of the frit where slumping and excessive grain growth take place. Finally, the firing range between the avoidance of cristobalite and the partial melting of the frit becomes narrower at higher silica (between 74% and 80% $SiO_2$) with an absolute difference of only about 15°C. at 77% $SiO_2$ (plus 19.1% $Al_2O_3$ and 4.2% $Li_2O$). Efficient production of ware with such a narrow firing range would be very costly, and consequently the need for a way of suppressing cristobalite at lower firing temperatures was needed.

SUMMARY OF THE INVENTION

It is therefore an object of the present invention to provide a method of suppressing the development of cristobalite in high silica, lithium-aluminosilicate (LAS) glasses and glass-ceramics at firing temperatures substantially below a point of partial melting of the glasses as characterized by slumping and excessive grain growth.

In accordance with the objective, I have found a series of cristobalite suppressant compounds which, when present in the shaped LAS body prior to sintering, inhibit the formation of cristobalite therein at lower firing temperatures than possible without the suppressant. The suppressant compounds may be added to the glass raw batch prior to melting or may be added to the glass frit prior to shaping the body.

Previously, the method of making a LAS crystalline ceramic article from a finely divided glass frit consisting essentially of (by weight on the oxide basis) 3.5–7.5% $Li_2O$, 15–30% $Al_2O_3$ and 65–80% $SiO_2$, with a mole ratio of $Al_2O_3$:$Li_2O$ being about 1.0–1.5 comprised (a) shaping or molding the frit into a green article with or without a 0.01–3.5% addition to the frit of a particulate seeding material, and (b) firing the green article at about 900°–1350°C. for a time (usually 1–24 hours) sufficient to sinter the frit to a coherent article and to cause the glass to crystallize in situ.

My improvement over the old method is concerned with only the high silica (74–80%) compositions of the stated range wherein the above method results in the appearance of a cristobalite phase with the spodumene phase in the crystallized body. Surprisingly, my improvement results in the suppression of cristibolite in the sintered body. The improvement comprises adding to either the glass raw batch or the frit, a cristobalite suppressant selected from $Na_2O$, $K_2O$, $Cs_2O$, $MgO$, $CaO$, $SrO$, $BaO$, $Y_2O_3$, $La_2O_3$, $TiO_2$, $Nb_2O_5$, $Ta_2O_5$, $ZnO$, $B_2O_3$, $PbO$ and $Sb_2O_3$; the oxides having divalent and tetravalent cations (even valence cations) at a concentration of up to about 0.02 moles per 100 grams of glass and the remaining oxides at up to about 0.01 moles per 100 grams of glass. I can also effectively omit one or more of the suppressants, for example $TiO_2$, and select one or more of the remaining suppressants.

A particularly preferred frit composition is 76–78% $SiO_2$, 18–19% $Al_2O_3$, 4–5% $Li_2O$ with 0.5–1.5 weight percent $TiO_2$ (0.00625–0.0188 moles $TiO_2$ per 100 grams of the glass). I have found that suppressant quantites above that required can be detrimental to mechanical and thermal stability over long periods of use.

The two different molar limits are set for oxides of the even and the odd valence cations in order that there be supplied to the crystallizable glass a similar number of cations rather than a similar number of molecules for each suppressant oxide over the range of concentrations.

The oxide materials seem to be effective for suppressing cristobalite in the LAS glass-ceramics of the invention when present in very small concentrations, for example as low as 0.001 moles per 100 grams of glass or less with various of the oxides. In addition, the amount of a suppressant which is effective in suppressing cristobalite is temperature dependent so that a small quantity may be partially effective at one temperature and completely effective in eliminating cristobalite at a temperature 10–20 centigrade degrees higher. I consider an oxide to be effective when it substantially eliminates the cristobalite phase from the LAS bodies when fired in the reasonable firing range below the temperature of partial melting, and suitably within the range of 1200°C.–1350°C. (preferably about 1250°C.–1310°C.).

DESCRIPTION OF THE PREFERRED EMBODIMENTS

Illustrative procedures for preparing the glass frits, and shaping and firing to sintered crystalline ceramic (or glass-ceramic) articles are described in U.S. Pat. No. 3,600,204 and in the two patents specifically referred to therein (all of which are incorporated herein by reference). However, other shapes and types of formed articles can be made from the frit and the suppressant material as desired. Also, other appropriate conventional ceramic shaping or fabrication processes (e.g., dry or plastic pressing, extrusion, injection moulding, isostatic pressing, slip casting, etc.) can be employed if necessary to fabricate a particular article.

Figure 1:
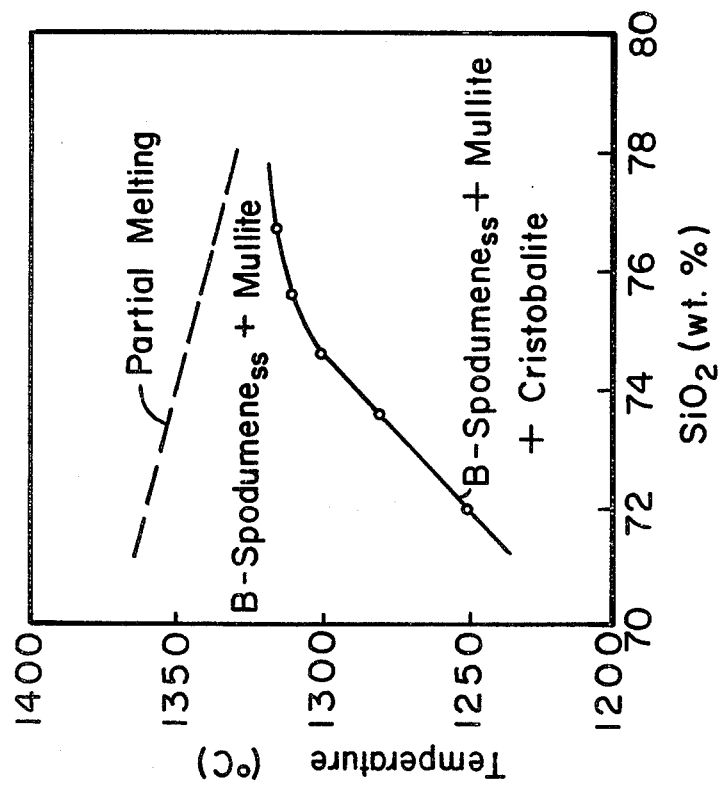
FIG. 1 shows a portion of the phase diagram for compositions along the join from 5% $LiO_2$ - 23% $Al_2O_3$ - 72% to 100% $SiO_2$ showing the narrowing of the firing range necessary to produce only beta-spodumene solid solution and mullite without melting.

In defining the problem to be overcome by the invention, sample glass compositions lying on the join connecting the composition 5% $Li_2O$ - 23% $Al_2O_3$ - 72% $SiO_2$ and 100% $SiO_2$ were prepared by melting, fritting and finally sintering. A phase analysis was completed on the samples and a sample phase diagram was theorized over the range from 70–80% silica. The approximation of that portion of the phase diagram is shown as FIG. 1 and demonstrates that the temperature range for sintering the frits to obtain the desired beta-spodumene and mullite phases without significant melting in the fired ware decreases with increasing silica content along the join. The thermal expansion decreases in the same direction so that the objective of the invention became increasing the firing range at the high silica end of the stated compositional range.

EXAMPLE I

By way of typical illustration of the invention a base glass composition and three series of the base glass composition containing varying amounts of $Na_2O$, $TiO_2$ and BaO were prepared by melting batches of lithium carbonate, calcined alumina, silica sand and fine $Na_2CO_3$, $TiO_2$ or BaO. The base glass composition was, by weight on the oxide basis, 4.3% $Li_2O$ - 19.7% $Al_2O_3$ - 76.0% $SiO_2$, and the percentage addition of the suppressants or dopants was made on the basis of the base glass weight.

The glasses was quenched in water, dried, crushed to minus 8 Tyler mesh, and milled for 16 hours with a naphthenic acid grinding aid. The fine glass powders were then mixed with, 0.5% beta-spodumene solid solution crystals to act as a seeding agent, and 4% polyethylene glycol binder in trichloroethane vehicle. The batches were subsequently granulated through a 16 mesh sieve and pressed into bar and pill specimens in steel molds at 5000 psi. The specimens were fired in the range of 1270°C. to 1310°C. according to the following schedule:

Room temperature to 750°C. at 100° per hour;
750°C. to 1000°C. at 20° per hour;
1000°C. to soak temperature at 80°C. per hour;
Hold at soak temperature for 5 hours; and
Cool at furnace rate.

The relative amounts of cristobalite left in the fired bodies was determined and compared by measuring the height of the 22° 2 $\theta$ cristobalite X-ray diffraction peak with the following results.

Table I

| Sample | Additive wt. % | Cristobalite Peak Height (Relative) | | | | |
|---|---|---|---|---|---|---|
| | | 1270°C. | 1280°C. | 1290°C. | 1300°C. | 1310°C. |
| 1 | Base composition | 4.1 | 4.7 | 5.3 | 3.0 | 0.4 |
| 2 | 0.04 $Na_2O$ | 4.6 | 4.7 | 3.5 | 1.1 | 0.7 |
| 3 | 0.08 $Na_2O$ | 4.1 | 3.6 | 2.5 | 0.0 | 0.0 |
| 4 | 0.16 $Na_2O$ | 2.7 | 1.9 | 0.0 | 0.0 | 0.0 |
| 5 | 0.32 $Na_2O$ | 1.5 | 0.0 | 0.0 | 0.0 | 0.0 |
| 6 | 0.50 $TiO_2$ | 3.3 | 4.3 | 2.9 | 0.0 | 0.0 |
| 7 | 1.00 $TiO_2$ | 2.8 | 3.3 | 0.0 | 0.0 | 0.0 |
| 8 | 2.00 $TiO_2$ | 0.8 | 0.0 | 0.0 | 0.0 | 0.0 |
| 9 | 0.25 BaO | — | 1.2 | 0.0 | 0.0 | 0.0 |
| 10 | 0.50 BaO | — | 0.0 | 0.0 | 0.0 | 0.0 |

The results show that the cristobalite phase may be avoided with a combination of higher temperature and larger additions of the dopants.

EXAMPLE II

The additives need not be melted with the glass, but may be added to the base glass frit prior to pressing the specimens. In the following example, the base glass was prepared as described above but with an oxide composition of 4.2% $Li_2O$ - 19.1% $Al_2O_3$ - 76.7% $SiO_2$. The glass powder was prepared and the various cristobalite suppressant compounds were added in the quantities specified for each 100 grams of glass as fine (−325 mesh) powders along with the polyethylene glycol binder and the vehicle.

Pill specimens were pressed and fired according to the above firing schedule to peak temperatures of 1250°C., 1275°C., and 1300°C. The base composition was also fired and required a firing temperature of 1315°C. to completely avoid the cristobalite phase in the fired sample. Again the 22° 2 $\theta$ cristobalite peak was measured and reported in Table II for all samples to give a relative measure of the suppressant effect.

Table II

Cristobalite XRD peak height for doped
4.2% $Li_2O$ - 19.1% $Al_2O_3$ - 76.7% $SiO_2$
glass powder compactions fired at 1250°C., 1275°C. and 1300°C.

| Oxide | Wt. per 100 grams glass | Moles per 100 grams glass | Cristobalite Peak Height (Relative) | | |
|---|---|---|---|---|---|
| | | | 1250°C. | 1275°C. | 1300°C. |
| No additive | 0.00 | 0.00 | 14.9 | 13.7 | 7.8 |
| $Na_2O$ | 0.402 | 0.00648 | 2.1 | 0.0 | 0.0 |
| $K_2O$ | 0.614 | 0.00652 | 1.1 | 0.8 | 0.7 |
| $Cs_2O$ | 1.820 | 0.00642 | 0.0 | 0.0 | 0.0 |

Table II-continued

Cristobalite XRD peak height for doped
4.2% Li₂O - 19.1% Al₂O₃ - 76.7% SiO₂
glass powder compactions fired at 1250°C., 1275°C. and 1300°C.

| Oxide | Wt. per 100 grams glass | Moles per 100 grams glass | Cristobalite Peak Height (Relative) 1250°C. | 1275°C. | 1300°C. |
|---|---|---|---|---|---|
| MgO | 0.523 | 0.0130 | — | 9.2 | 1.8 |
| CaO | 0.725 | 0.0129 | 3.2 | 1.9 | 0.0 |
| SrO | 1.54 | 0.0149 | 0.0 | 0.0 | 0.0 |
| BaO | 1.98 | 0.0129 | 0.0 | 0.0 | 0.0 |
| Y₂O₃ | 1.45 | 0.00642 | 1.1 | 4.8 | 0.0 |
| La₂O₃ | 2.10 | 0.00445 | 3.0 | 0.0 | 0.0 |
| TiO₂ | 1.03 | 0.0129 | — | 11.3 | 0.0 |
| Nb₂O₅ | 1.72 | 0.00647 | — | 10.0 | 2.8 |
| Ta₂O₅ | 2.85 | 0.00645 | — | 8.4 | 0.0 |
| ZnO | 1.05 | 0.0129 | — | 10.1 | 0.0 |
| B₂O₃ | 0.452 | 0.00649 | — | 14.7 | 0.8 |
| PbO | 1.44 | 0.00645 | 0.9 | 1.1 | 0.8 |
| Sb₂O₃ | 1.88 | 0.00645 | 9.4 | 2.3 | 0.0 |

Figure 2:
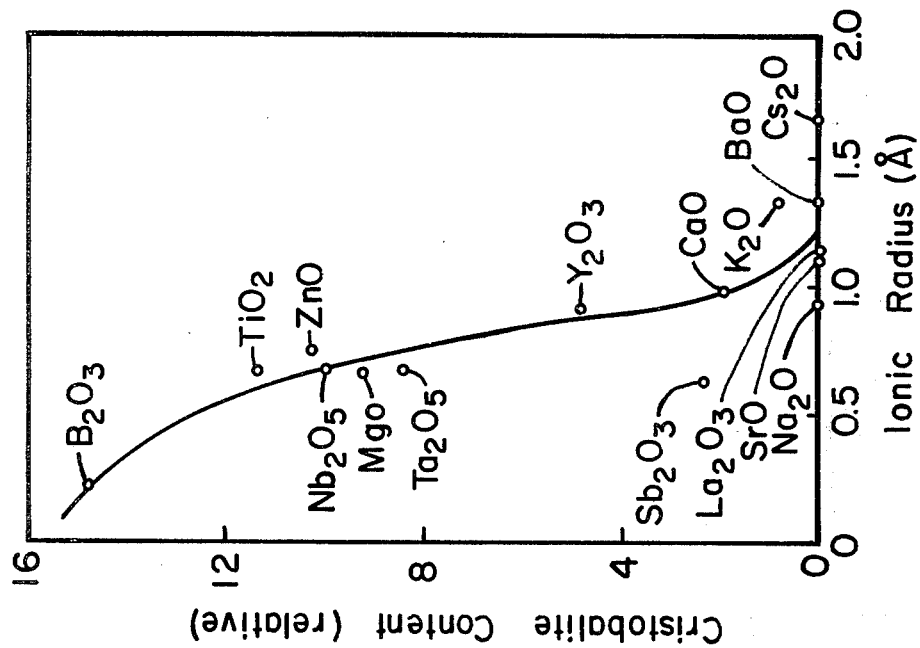
FIG. 2 shows the relative effectiveness of the suppressants from Table II as a function of the cation size in a body of 4.2% $Li_2O$ - 19.1% $Al_2O_3$ - 76.7% $SiO_2$ fired at 1275°C.

FIG. 2 shows the relative performance of the oxide suppressants in the above example with the base composition of 4.2% $Li_2O$ - 19.1% $Al_2O_3$ - 76.7% $SiO_2$ and fired at 1275°C. The ionic radius of the cation is plotted versus the relative cristobalite content (as measured by the XRD peak height) and shows that the larger cations tend to be most effective at the lower temperature of 1275°C. All dopants are effective in substantially reducing cristobalite at 1300°C. which is at least about 30° below the temperature at which partial melting of the glass composition is noticed.

EXAMPLE III

A preferred embodiment of the invention was demonstrated by comparing data from the testing of honeycomb structures or matrix bodies made as described in U.S. Pat. No. 3,600,204 with and without the suppressant $TiO_2$ therein. Matrices made from a glass frit with an oxide composition of 5 weight percent $Li_2O$, 23 weight percent $Al_2O_3$ and 72 weight percent $SiO_2$ (labeled composition X-3) were compared to matrices made from a glass frit having a base composition on the oxide basis of 4.5 weight percent $Li_2O$, 18.5 weight percent $Al_2O_3$ and 77 weight percent $SiO_2$ and having therein 1.0 weight percent $TiO_2$ as a cristobalite suppressant (labeled composition Y-3). The suppressant was melted with the glass batch in preparing the frit. Both frits were seeded with 0.2 weight percent beta-spodumene solid solution crystals. The firing schedule employed for the matrices was as follows, with a peak temperature for the Y-3 suppressant containing composition being 1295° C. and for the X-3 composition 1310°C. Substantially no cristobalite phase was present in either sintered body.

Room temperature to 740°C. in one hour;
Hold 3.5 hours at 740°C.;
740°C.–810°C. at 140°C. per hour;
Hold 2.75 hours at 810°C.;
810°C.–860°C. at 14°C. per hour;
860°C.–940°C. at 12°C. per hour;
940°C.–1025°C. at 24°C. per hour;
1025°C. to peak temperature at 21°C. per hour;
Hold 10 hours at peak temperature;
Peak temperature to 1000°C. at 50°C. per hour;
1000°C.–800°C. at 100°C. per hour; and
800°C. to room temperature at closed furnace rate.

Thermal expansion curves for samples cut from the matrices show a lower expansion for the Y-3 composition. X-3 contracts a maximum of about 75 parts per million (ppm) at 300°C. and then shows overall expansion of about 300 ppm at 800°C. Y-3 contracts about 250 ppm from 0°C. to 500°C. and then expands to an overall contraction of about 150 ppm at 800°C. Y-3 shows about zero overall expansion at about 900°C.

Dimensional stability for the two compositions is similar at 800°C. for 1000 hours but the X-3 composition (without suppressant) is superior at 1000°C. for the same time. X-3 shows almost 150 ppm contraction while Y-3 experiences greater than 350 ppm contraction. Increasing amounts of suppressant further reduce stability and should therefore be limited. $TiO_2$ should be limited to about 1.5% by weight (based on the weight of the glass) or less with 1% being preferred.

It is interesting to note that it has been earlier discovered that greater than 2 weight percent (and usually about 3.5 percent) $TiO_2$ in a broad range of LAS glass compositions causes nucleation of crystals at low temperatures. My present invention requires substantially less than 2 weight percent $TiO_2$ and I have actually found such additional $TiO_2$ detrimental because of the low temperature crystallization leading to incomplete sintering of the glass frit. At levels of about 1.5% $TiO_2$, sintering can proceed substantially to completion in the glassy state.

I claim:
1. A method of inhibiting the development of a cristobalite phase in a sintered crystalline ceramic article made from one or more finely divided base glass frits in the aggregate consisting essentially, by weight on the oxide basis, of 3.5–7.5% $Li_2O$, 15–30% $Al_2O_3$, and 74–80% $SiO_2$, with the mole ratio of $Al_2O_3:Li_2O$ being between about 1.0–1.5, which method comprises:
   I. preparing the particulate glass frits by melting, quenching, and comminuting a raw material batch,
   II. shaping the frit and optionally a particulate crystalline seeding material into a green article, and
   III. firing the green article to about 1200°–1350°C. for a time sufficient to sinter the frit into a coherent article and to cause the glass to crystallize in situ;
wherein the improvement comprises:
   adding into either step I or step II a cristobalite suppressing oxide selected from $Na_2O$, $K_2O$, $Cs_2O$, MgO, CaO, SrO, BaO, $Y_2O_3$, $La_2O_3$, $TiO_2$, $Nb_2O_5$, $Ta_2O_5$, ZnO, $B_2O_3$, PbO and $Sb_2O_3$; the oxides being selected in an effective amount for suppressing the formation of a cristobalite phase in the sintered article up to a concentration of 0.02 moles per 100 grams of glass frit of the oxides having an even valence cation and up to a concentration of

0.01 moles per 100 grams of glass frit of the remaining oxides.

2. The method of claim 1 wherein the suppressing oxide is added in at least a concentration of 0.001 moles per 100 grams of glass frit.

3. The method of claim 2 wherein the ceramic article is made from a single glass frit and the suppressing oxide is melted with the raw material batch in step I.

4. The method of claim 1 wherein the base glass consists essentially of 4–5% $Li_2O$, 18–19% $Al_2O_3$, and 76–78% $SiO_2$, the suppressing oxide is titania and the firing temperature is about 1275°–1310°C.

5. The method of claim 4 wherein the ceramic article is made from a single glass frit and 0.5–1.5 weight percent titania is melted with the raw material batch in step I.

* * * * *

UNITED STATES PATENT OFFICE
CERTIFICATE OF CORRECTION

PATENT NO. : 3,951,670
DATED : April 20, 1976
INVENTOR(S) : BUSH, Edward A.

It is certified that error appears in the above-identified patent and that said Letters Patent are hereby corrected as shown below:

In the Title of the front page, change "AL$_2$O" to --Al$_2$O$_3$-- .

Column 1, in the Title, change "LI$_2$O-AL$_2$O" to --Li$_2$O-Al$_2$O$_3$--.

Column 4, line 3, change "was" to --were--.

Signed and Sealed this

Twentieth Day of July 1976

[SEAL]

Attest:

RUTH C. MASON
*Attesting Officer*

C. MARSHALL DANN
*Commissioner of Patents and Trademarks*